United States Patent
Otaka

(10) Patent No.: US 11,785,519 B2
(45) Date of Patent: Oct. 10, 2023

(54) CONTROLLER, TERMINAL DEVICE, CONTROL METHOD, AND PROGRAM FOR HANDOVER CONNECTIONS

(71) Applicant: Honda Motor Co., Ltd., Tokyo (JP)

(72) Inventor: Masaru Otaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 17/173,385

(22) Filed: Feb. 11, 2021

(65) Prior Publication Data

US 2021/0168687 A1  Jun. 3, 2021

Related U.S. Application Data

(63) Continuation of application No. PCT/JP2019/014317, filed on Mar. 29, 2019.

(51) Int. Cl.
*H04W 4/00* (2018.01)
*H04W 36/30* (2009.01)
(Continued)

(52) U.S. Cl.
CPC .......... *H04W 36/30* (2013.01); *H04B 17/364* (2015.01); *H04L 43/0852* (2013.01);
(Continued)

(58) Field of Classification Search
CPC ..... H04W 36/30; H04W 24/10; H04W 36/32; H04W 72/543; H04W 36/245;
(Continued)

(56) References Cited

U.S. PATENT DOCUMENTS

| 7,577,123 | B2 * | 8/2009 | Hashimoto | H04L 67/04 370/395.42 |
| 8,351,942 | B2 * | 1/2013 | Wang | H04W 76/50 455/436 |

(Continued)

FOREIGN PATENT DOCUMENTS

| CN | 101312594 A | 11/2008 |
| EP | 2117170 A1 | 11/2009 |

(Continued)

OTHER PUBLICATIONS

Notice of Reasons for Refusal from Japan Patent Office for Japanese Patent Application No. 2021-511762, dated Dec. 5, 2022.

(Continued)

*Primary Examiner* — Amancio Gonzalez
(74) *Attorney, Agent, or Firm* — Aaron Fong; American Honda Motor Co., Inc.

(57) ABSTRACT

A controller, terminal device, control method, and program for handover connections is provided. A controller may acquire estimated communication delay information regarding communication via base stations. A terminal device connected to another base station different from the base station above may acquire requested delay information regarding allowable delay. The terminal device may be notified of settings regarding cells that should be measured for wireless quality by the terminal device based on communication delay information of the base station and requested delay information. Handover control of the terminal device may be performed based on the terminal device reporting the measured wireless quality based on these settings.

20 Claims, 5 Drawing Sheets

(51) Int. Cl.
*H04B 17/364* (2015.01)
*H04L 43/0852* (2022.01)
*H04W 24/10* (2009.01)
*H04W 36/32* (2009.01)
*H04W 72/543* (2023.01)

(52) U.S. Cl.
CPC ........... *H04W 24/10* (2013.01); *H04W 36/32* (2013.01); *H04W 72/543* (2023.01)

(58) Field of Classification Search
CPC .............. H04W 4/44; H04W 36/0061; H04W 36/0083; H04B 17/364; H04L 43/0852
USPC ........................................................ 370/331
See application file for complete search history.

(56) References Cited

U.S. PATENT DOCUMENTS

| | | | | |
|---|---|---|---|---|
| 8,819,309 | B1* | 8/2014 | Bruce | G06F 13/385 |
| | | | | 710/33 |
| 9,301,234 | B2* | 3/2016 | Teyeb | H04W 36/30 |
| 9,503,380 | B2* | 11/2016 | Miyamoto | H04L 47/6275 |
| 10,114,680 | B2* | 10/2018 | Wang | H04L 67/51 |
| 10,425,146 | B2* | 9/2019 | Kahtava | H04W 24/10 |
| 10,588,111 | B2* | 3/2020 | Fujishiro | H04W 68/02 |
| 10,785,792 | B2* | 9/2020 | Wang | H04W 72/23 |
| 10,798,721 | B2* | 10/2020 | Norita | H04W 72/56 |
| 10,880,835 | B2* | 12/2020 | Wang | H04W 52/0235 |
| 11,259,221 | B2* | 2/2022 | Matsuo | H04W 36/08 |
| 11,452,114 | B2* | 9/2022 | Morioka | H04W 28/26 |
| 2004/0058678 | A1* | 3/2004 | deTorbal | H04W 36/32 |
| | | | | 455/99 |
| 2004/0266434 | A1 | 12/2004 | Lehtinen et al. | |
| 2007/0087752 | A1 | 4/2007 | Voyer et al. | |
| 2009/0207813 | A1 | 8/2009 | Brunel et al. | |
| 2011/0211452 | A1* | 9/2011 | Murakami | H04W 36/08 |
| | | | | 370/237 |
| 2013/0229939 | A1 | 9/2013 | Teyeb et al. | |
| 2015/0208319 | A1* | 7/2015 | Kim | H04W 76/00 |
| | | | | 455/513 |
| 2016/0007368 | A1* | 1/2016 | Moon | H04W 56/00 |
| | | | | 370/329 |
| 2016/0212674 | A1 | 7/2016 | Nakamura et al. | |
| 2018/0020382 | A1* | 1/2018 | Kim | H04W 48/10 |
| 2018/0278393 | A1* | 9/2018 | Akula | H04W 72/569 |
| 2019/0074955 | A1* | 3/2019 | Shimomura | H04W 72/20 |
| 2021/0014771 | A1* | 1/2021 | Peng | H04W 36/36 |
| 2022/0150761 | A1* | 5/2022 | Kim | H04W 28/02 |
| 2022/0217760 | A1* | 7/2022 | Iyer | H04L 5/0053 |

FOREIGN PATENT DOCUMENTS

| | | |
|---|---|---|
| JP | 2007124642 A | 5/2007 |
| JP | 2017216663 A | 12/2017 |
| WO | WO2012059131 A1 | 5/2012 |
| WO | WO2016082940 A1 | 6/2016 |

OTHER PUBLICATIONS

European Search Report of European application No. EP19923437, dated Mar. 7, 2022.
Communication from the Examining Division or Related European Application EP19923437, dated Nov. 21, 2022.
International Search Report of related international application PCT/JP2019/014317, dated May 28, 2019.
English Translation of International Search Report of related international application PCT/JP2019/014317, dated May 28, 2019.
Written Opinion of the International Searching Authority of related international application PCT/JP2019/014317, dated May 28, 2019.
Notification of first review comments from Chinese Intellectual Property Office for Chinese Patent Application No. 2019800941063, dated May 31, 2023.

* cited by examiner

CONTROLLER, TERMINAL DEVICE, CONTROL METHOD, AND PROGRAM FOR HANDOVER CONNECTIONS

RELATED DISCLOSURE

This disclosure is a continuation of International Patent Application No. PCT/JP2019/014317 filed Mar. 29, 2019 titled Controller, Terminal Device, Control Method, and Program, which is hereby incorporated by reference in its entirety.

FIELD

The present disclosure is related to handover technology for terminal devices, and more particularly, to handover of communication devices to base stations with low communication delay.

BACKGROUND

An operator at a remote location may operate and move a vehicle through conventional remote driving technologies. One element with remote driving may be adequate suppression of communication delay between an operator device operated by an operator performing remote driving and a terminal device provided in a vehicle.

A cellular communication network that extends throughout the entire communication area may be used for communication when controlling vehicle traveling such as with remote driving. As the terminal device equipped on the vehicle moves as the vehicle moves, maintaining a connection between the terminal device and one base station may be difficult.

Communication delay via the base station that the terminal device is currently connected may be sufficiently small. However, communication delay via handover to another base station may be increased beyond what is permissible.

SUMMARY

According to one aspect of the present disclosure, a controller is provided. The controller may include a memory for storing computer readable code and a processor operatively coupled to the memory. The processor may be configured to: acquire communication delay information by communication with a base station, acquire requested delay information regarding allowable delay of a terminal device connected for communication to another base station, and notify a setting to the terminal device regarding cells which the terminal device measures wireless quality, wherein the notified setting is based on the communication delay information with the base station and the requested delay information regarding allowable delay of the terminal device connected for communication to the other base station.

According to another aspect of the present disclosure, a terminal device is provided. The terminal device may include a communication circuit and a memory storing instructions when executed by a processor causes the processor to perform processes. The processes may include providing requested delay information regarding allowable delay to a base station connected for communication through the communication circuit, receiving a setting regarding cells for which the terminal device measures wireless quality, wherein the setting is based on estimated communication delay information and the requested delay information for another base station that the terminal device can connect to for communication, and notifying the wireless quality measured based on the setting to the base station.

According to yet another aspect of the present disclosure, a computer-implemented handover method from a base station is provided. The method may include acquiring estimated communication delay information regarding communications via base stations, acquiring requested delay information regarding allowable delay of terminal devices connected for communication to another base station, and notifying a terminal device with settings regarding cells that are measured for wireless quality by the terminal device based on the communication delay information of the base station and the requested delay information.

BRIEF DESCRIPTION OF THE DRAWINGS

The attached drawings are included in and make up a portion of the specification, illustrate embodiments of the present disclosure, and are used along with descriptions thereof to describe a principle of the present disclosure.

DESCRIPTION

Embodiments are described in detail below with reference to the attached drawings. Note that the following embodiments do not limit the disclosure according to the claims, and not all combinations of the features described in the embodiments are essential to the disclosure. Two or more of a plurality of features described in the embodiments may be arbitrarily combined. In addition, identical or similar configurations use the same reference number and duplicate explanations are omitted.

Figure 1:
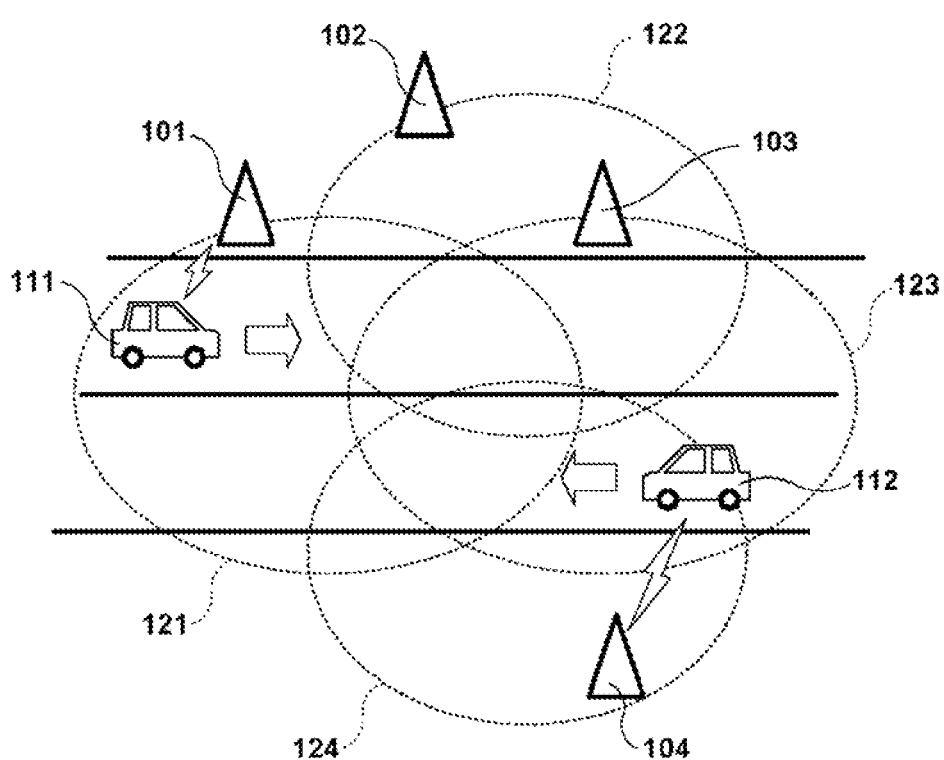
FIG. 1 is a drawing that illustrates an exemplary system configuration in accordance with one aspect of the present disclosure.

FIG. 1 illustrates an exemplary configuration of a communication system according to the present disclosure. The present communication system is, for example, a cellular wireless communication system, and is made up of base stations 101 to 104 and terminal devices 111 and 112. The base stations 101, 102, 103 and 104 respectively form cells 121, 122, 123 and 124 and perform wireless communication by connecting to a terminal device within the formed cell thereof. Note that the terminal device performs wireless communication by connecting to one of the base stations that forms the cell covering the position of the device thereof. In other words, at least a part of a cell may be arranged and superimposed with other cells, such that terminal devices in these superimposed areas connect with a base station forming one of the cells thereof. In this example, base stations 101 to 104 and terminal devices 111 and 112 are very likely base stations and terminals using a 5th generation (5G) cellular communication system (gNodeB), however, the base stations and terminals may also use other communication standard generations such as LTE (Long-Term Evolution). In addition, the base stations 101 to 104 may be directly connected to a core network or relay stations wirelessly connected to other base stations.

Note that the present embodiment is a description of an example of performing operational control and the like of a vehicle through a wireless communication with a terminal device equipped on a vehicle for remote driving and the like. However, this is only an example, such that any arbitrary terminal device with wireless function that may connect to a cellular communication network such as a smartphone, mobile telephone, personal computer, and the like, may be used. In addition, the present embodiment illustrates an example where one (1) base station forms one (1) cell, however, one (1) base station may commonly form a plurality of cells.

FIG. 1 illustrates an example where the terminal device 111 is within the range of the cell 121 formed by base station 101 and performs wireless communication by connecting to the base station 101. In addition, FIG. 1 illustrates an example where the terminal device 112 is within the range of the cell 124 formed by the base station 104 and performs wireless communication by connecting to the base station 104. Note that the position of the terminal device 112 is within the range of the cell 123 formed by the base station 103. However, for reasons such as if the wireless quality of the signal from the base station 104 is of a higher quality than the wireless quality of the signal from the base station 103, and the like, the terminal device 112 may connect to the base station 104.

In the present embodiment, the communication delay between the operator device (not illustrated) operated by the remote driving operator and the opposing communication device is used in place of or in addition to wireless quality as the selection standard for base stations as a connection point for terminal devices. In other words, a handover process of the terminal device is executed such that the terminal device may be connected to a base station in a path with a sufficiently low communication delay. Therefore, the terminal device of the present embodiment provides notification of information regarding allowable communication delay thereof (at times called "requested delay" below) to the currently connected base station. This notification, for example, is provided from the terminal device to the base station (via a controlled message such as RRC and the like) during the procedure where the terminal device establishes a connection with the base station. In addition, this notification may also be sent from a terminal device (currently connected to the base station, for example) to the base station when starting to execute a predetermined application, such as remote driving and the like. Furthermore, the terminal device may also perform this notification periodically (for example, when transmitting a periodic wireless quality measurement report (CQI (Channel Quality Indicator)), and the like). The notification may also be performed at other opportunities (in this example, when transmitting a non-periodic CQI report, and the like). Note that the terminal device may notify the base station with the requested delay or may notify the base station regarding other information that may be used to specify requested delay of the type of application to be executed.

A base station according to the present embodiment executes a process of handover of a terminal device requiring handover to another base station that satisfies the requested delay thereof (where communication delay that is lower than the requested delay is achievable). For example, a base station knows the communication delay between each cell formed by base stations and the terminal devices connected to these cells. The base station then selects cells that satisfy the requested delay as candidates as a handover destination. In other words, the base station removes any cells that do not satisfy the requested delay as a candidate for handover destination. In this example, the base station changes the threshold value used for handovers of each cell according to whether or not the cells satisfy the requested delay. Smaller values of this threshold value enable handover of the terminal device more readily. For example, the same value as a conventional value used for those that satisfy the requested delay while a higher value than the conventional value used for those that do not satisfy the requested delay is used. In addition, in this case, the threshold value may be smaller than conventional values for cells that satisfy the requested delay, and may be the same or higher than conventional values for cells that do not satisfy the requested delay. Note that in the present embodiment, from the point of view of preventing a handover to cells that do not satisfy the requested delay, the threshold value may be raised higher for cells that do not satisfy the requested delay. The threshold value may be lowered for cells that satisfy the requested delay where the handover may be executed early, for example, depending on the state of the terminal device and the degree of congestion of surrounding base stations. In other words, control of increasing the threshold value for cells that do not satisfy the requested delay may be executed with a higher priority than control of decreasing the threshold value of cells that satisfy the requested delay.

Here, the threshold value is a value measured, for example, by the base station for all cells that are assumed to be adjacent, where terminal devices are detectable. Based on this setting, the terminal device, for example, transmits a Measurement Report (MR) of the wireless quality that includes cell specifying information to the base station conditioned upon the value indicating wireless quality measured for the cell exceeding the threshold value which was set for that cell. In addition, the terminal device may also transmit an MR that includes information specifying a cell to the base station on the condition that the difference between the wireless quality measured for a cell and the wireless quality measured for the currently connected base station exceeds the threshold value which was set for that cell. Upon receiving the MR which was transmitted, the base station then executes the process of handing over the terminal device to the cell reported in the MR. Note that a description of the process for this handover is omitted as the process is the same which is used conventionally.

As described above, even if the wireless quality of a cell that satisfies the requested delay is relatively low, executing a handover to that cell may be made easier by lowering the threshold value of the cell. Similarly, even if the wireless quality of a cell that does not satisfy the requested delay is high, executing a handover to that cell may be prevented by increasing the threshold value of that cell.

Note that this threshold value may be a value that allows the terminal device to perform a handover more easily to the extent that the value is larger. In this case, the value is the same as conventional values for cells that satisfy the requested delay, and is a lower value than conventional values for cells that do not satisfy the requested delay. In addition, in this case, the threshold value may be larger than conventional values for cells that satisfy the requested delay, and may be the same or lower than conventional values for cells that do not satisfy the requested delay. Here, in this example, control of decreasing the threshold value for cells that do not satisfy the requested delay may be performed with a higher priority than control of increasing the threshold value of cells that satisfy the requested delay. In addition, the threshold value is a value that may be set such that executing a handover is made easier for cells with a lower communication delay, or a value that may be set such that executing a handover is made more difficult for cells with a higher communication delay. In other words, the threshold value may also be set such that the value changes gradually according to the communication delay in place of in addition to whether or not the requested delay is satisfied. In this manner, the threshold value may be set in various forms, to the extent where executing a handover is made easier for cells that satisfy the requested delay and executing a handover is made more difficult for cells that do not satisfy the requested delay.

In addition, in place of or in addition to changing the threshold values for handover, base stations may set a list for adjacent cells where wireless quality is measured by terminal devices according to the communication delay of terminal devices connected to the base stations that form each of the cells. For example, a base station may prepare a list of adjacent cells for which wireless quality has been measured by adjacent terminal devices that does not include cells that do not satisfy the requested delay and transmit this adjacent cell list to terminal devices. Thus, the terminal devices no longer recognize cells that do not satisfy the requested delay as adjacent cells and stop measuring and reporting the wireless quality of these cells, preventing base stations from performing a handover to these cells.

The base station forming each of the cells obtain the communication delay for each cell by collecting information indicating the measured communication delay from previous connections and transmissions of other terminal devices to the base station. Each base station notifies the cells formed by the base station and other base stations that form adjacent cells of collected information related to an amount of communication delay. Each base station uses information related to the amount of communication delay acquired from other base stations for handover control as described above.

Information related to the amount of communication delay in this example may also be information indicating an estimated communication delay, that is, estimated based on measured values of communication delay. In addition, information related to communication delay, for example, may be information indicated by statistics such as the average value, standard deviation, mode, and the like of measured values of past communication delays, or may also be the maximum value of past communication delays. Note that information related to communication delay may indicate value where the maximum past communication delay is multiplied by a predetermined multiplier or if the maximum value exceeds this predetermined value, the information may indicate that predetermined value. In other words, information related to communication delay may be information indicating a value based on the maximum value of past communication delays. Note that information related to communication delay may be information that indicates a value that increases the effect of measured communication delay values near the present and decreases the effect of measured communication delay values to the extent they are older. For example, a weighted average value of a large number of measured values added together after each being multiplied by a coefficient that decreases with larger time differences between the time when the measured value was acquired to the present time may be used as information related to communication delay. In addition, the measured communication delays may be classified according to the day of the week, time of day, and the like, for example. This is because, for example, the number of vehicles using vehicle operating control technology utilizing communication such as remote driving and the like may greatly change between days of the week and time intervals that are congested and days of the week and time intervals that are not, and this may also greatly change the communication delay. Here, base stations may determine information related to amount of communication delay being used based on the current state of the base station (or surrounding base stations) regarding date, time, or congestion or other attribute (such as an event) that contributes to amount of communication delay.

Note that information related to communication delay may be information indicating a plurality of steps, such that the measured communication delay is (1) low to the extent where remote driving may be executed with high precision, (2) high to the extent that remote driving may be executed but with relatively low precision, (3) high to the extent where remote driving cannot be executed, (4) high to the extent that there is no effective information concerning communication delay. Here, each base station will, for example, notify other base stations with a 2-bit piece of information indicating which of the levels (1) to (4) as described above are applicable according to the measured communication delay. This enables notification of information regarding actual communication delay for a specific purpose with sufficient accuracy using a small number of bits. Note that this is just one example and that the information may be indicated in any number of levels rather than four (4) levels. In addition, the information to be notified may also include numerical values directly indicating actual communication delay. This enables the base station that acquires this information to understand in detail what the communication delay will be during communication when terminal devices connect with other adjacent base stations. In this manner, measured communication delay information may be transmitted in an arbitrary form.

In addition, a communication delay is not only the transmission delay of the time taken to transmit (over a cable or air) a signal between two (2) devices forming a direct link, but also includes processing time for modulation and demodulation of signals for communication of each device participating in communication on the communication path, codes, ciphers, and the like. For example, the total time taken for a signal transmitted from a terminal device to arrive at the opposing device or the total time taken for a signal transmitted from the opposing device to arrive at the terminal device may be called communication delay. Note that communication delay may also mean the delay in the direct link between a terminal device and a base station, for example. Furthermore, communication delay may also mean, for example, the communication delay between the terminal device and the barrier gateway between networks in the case that the opposing device is in a network outside of the cellular communication network. In other words, unless specifically mentioned otherwise, communication delay means any delay on a part or all of the communication path, and is not limited to any one of these.

In this manner, a base station may select a cell that satisfies the terminal device requested delay as a candidate for handover destination based on measured communication delay. Note that measured communication delay information may be updated in real time or in fixed periods, and base stations are able to execute handover control as described above using the latest information. For example, even if a base station had removed a cell determined not to have met the requested delay from being a candidate as a handover destination at time A and if the cell then satisfies the requested delay at time B, the cell may be included as a candidate as a handover destination. In this manner, handover destination cells for terminal devices may be determined in a timely and appropriate manner by changing the candidates for handover destinations according to change in communication delay over time.

A description of several examples of configurations of base stations and terminal devices that execute the processes described above, and examples of operation thereof are given below.

Figure 2:
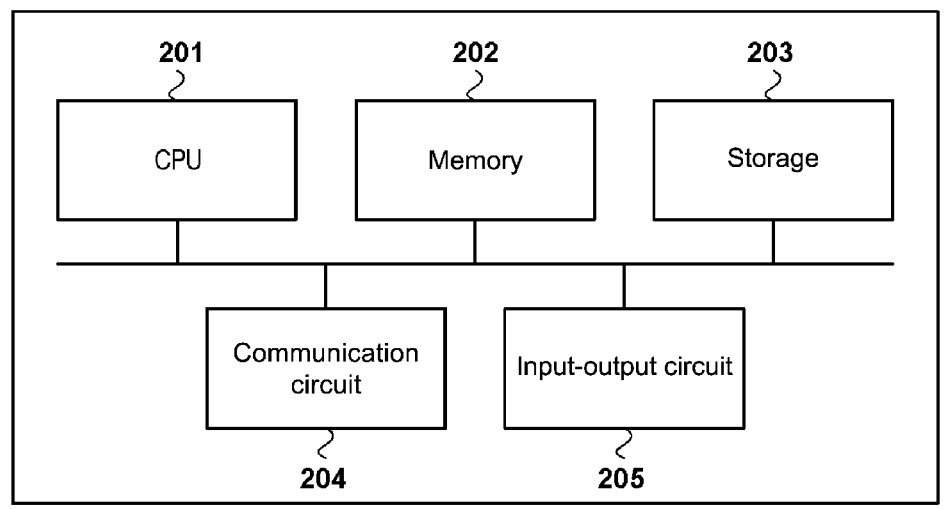
FIG. 2 is a drawing that illustrates an exemplary configuration of hardware for a base station and a terminal device in accordance with one aspect of the present disclosure.

FIG. 2 illustrates hardware configuration of a base station and a terminal device of the present embodiment. In this example, the base station and terminal device are communication devices that include a generic computer, for example, a CPU 201, memory 202, a storage device 203, a communication circuit 204, and an input-output circuit 205. The CPU 201, for example, executes processes as described below and controls the device as a whole by executing programs stored in the memory 202. Note that the CPU 201 may be replaced with one or more arbitrary processor(s) such as an MPU, ASIC, or the like. The memory 202 holds programs that allow the base station and the terminal device to execute various processes, and in addition, functions as working memory during program execution. In this example, the memory 202 is RAM (Random Access Memory) or ROM (Read-Only Memory). The storage device 203, for example, is a removable external storage device, internal hard disk drive, or the like, and stores various types of information. The communication circuit 204 executes signal processes related to communication and obtains various types of information from external devices and transmits various types of information to external devices through the communication network. Note that information acquired by the communication circuit 204 may be stored, for example, in the memory 202 or the storage device 203. Note that the base station and the terminal device have a plurality of communication circuits 204. For example, the base station has a communication circuit for wired communication available for communication with other base stations and a communication circuit for wireless communication with terminal devices. In this example the base station may establish an X2 interface with other base stations for direct communication or communicate with other base stations through the core network using an S1 interface. In addition, the base station may communicate by establishing a wireless link with another device in order to connect to other base stations or the core network. Furthermore, wireless connections between the base station and terminal devices are achieved through cellular communication standards such as 5G, LTE, and the like. The base stations and terminal devices may have any communication circuits for communication using supported communication standards. In addition, the terminal devices may have communication circuits to achieve wireless communication according to standards for forms of wireless communication other than cellular communication standards, such as WLAN. The input-output circuit 205, for example, controls screen information displayed on a display device (not illustrated), output of audio information output from speakers, and receiving user input via keyboards, pointing devices, and the like. Note that the input-output circuit 205 may also control devices that perform input and output at the same time, such as touch panels and the like. Note that the configuration in FIG. 2 is an example, such that the base stations and terminal devices may be configured, for example, using dedicated hardware that executes the processes as described above.

Figure 3:
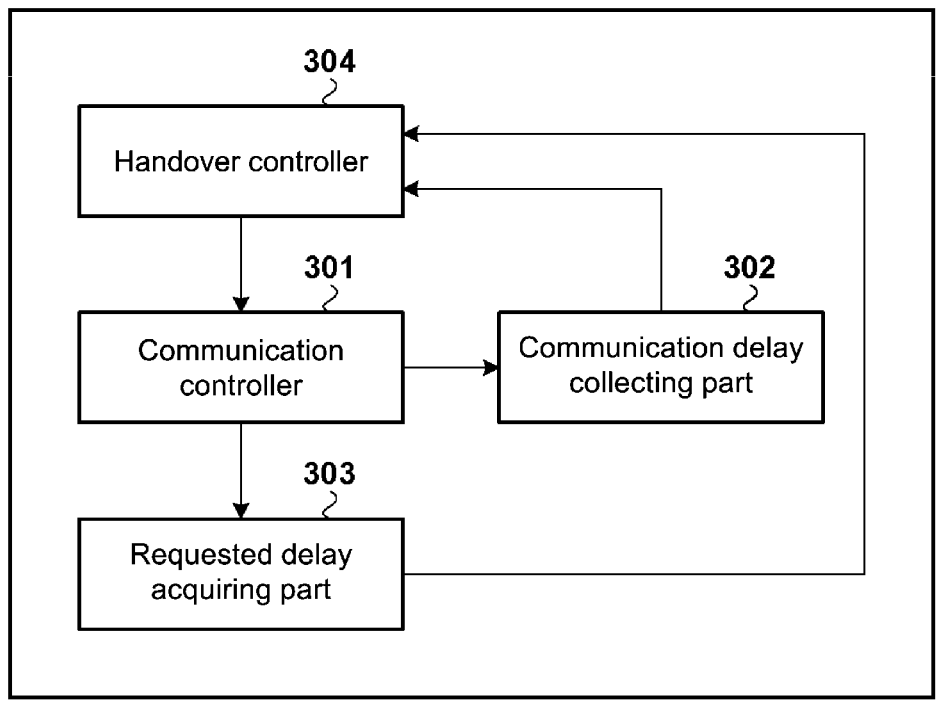
FIG. 3 is a drawing that illustrates an exemplary configuration example of functions of a base station in accordance with one aspect of the present disclosure.

FIG. 3 illustrates a configuration example of a base station according to the present embodiment. The base station is a base station that may perform wireless communication with terminal devices based on a cellular communication standard. An example of a function configuration for a base station includes a communication controller 301, a communication delay collector 302, a requested delay acquiring part 303, and a handover controller 304.

The communication controller 301 controls execution of communication by the base station. For example, the communication controller 301 controls the communication circuit 204 in order to perform wireless communication by establishing a wireless link between the communication controller 301 and terminal devices. In addition, the communication controller 301 controls the communication circuit 204 in order to communicate with other adjacent base stations establishing an X2 interface or through the core network by using an S1 interface. Note that other adjacent base stations means other base stations that form cells that are close to the cells formed by the base station. However, even if base stations are not actually close by, communication may be made between base stations that form cells within the range of the cell formed by the other base station or base stations that are within a predetermined distance from each other.

The communication delay collector 302 collects information related to estimated communication delay if a terminal device were to communicate using a cell formed by an adjacent base station (or in surround area if not adjacent) through the communication controller 301. In addition, with regards to terminal devices connected to and communicating with the base station, the communication delay collector 302 collects actual communication delay values for this communication and provides notification of this to other base stations. Communication delay may be, for example, the measured value of communication delay between a terminal device and the base station in the wireless dimension or the measured value of communication delay between a terminal device and an opposing device. Communication delay is measured, for example, by each base station based on the Round-Trip Time (RTT) of the base station transmitting a predetermined signal (with a duty to reply) to a terminal device or opposing device to receiving the corresponding response signal. After acquiring the RTT, each base station then subtracts the standby time of a terminal device or opposing device (or a gateway and the like) receiving the predetermined signal to transmitting a response signal from the RTT, divides that result by two (2), enabling the base station to find the specific communication delay between the base station and a terminal device or an opposing device. Note that each base station may acquire communication delay information by receiving a notice from terminal devices or opposing devices (or gateways) regarding the amount of communication delay during actual communication. The communication delay collector 302 acquires communication delay information collected by each base station and retains the communication delay information associated with the ID of the base station (or cell), for example. Note that the communication delay collector 302, for example, may group communication delay information by specific opposing devices such as operator devices for remote driving, by time intervals, days of the week, whether or not the day is a holiday, and the like. In other words, communication delay may be different for time intervals where any of the base station circuits or communication paths between terminal devices and opposing devices are congested and times intervals where there is no congestion. Therefore, classifying these delays and grouping the communication delay values by their properties allows the base station to use an appropriate value for handover control of terminal devices according to the properties of the communication environment at that time.

The requested delay acquiring part 303 acquires requested delay information that is requested for communication of terminal devices that are currently connected. In this example, the requested delay acquiring part 303 acquires requested delay information from a terminal device when establishing a connection with the terminal device. In addition, in this example, the requested delay acquiring part 303 may also acquire requested delay information for a terminal device handed over from another base station from the source base station. In other words, during the control procedure of a handover, the source base station of the handover may transfer requested delay information acquired beforehand from the terminal device to the handover destination base station through signaling between the base stations. Note that requested delay information may be information regarding the requested delay itself or other information that may specify the requested delay (for example, information regarding the type of application to be executed and the like).

The handover controller 304 executes the handover control of a terminal device based on communication delay information when the terminal device connected to another base station collected by the communication delay collector 302 and requested delay information acquired by the requested delay acquiring part 303.

The handover controller 304, for example, notifies terminal devices of threshold value information such that a handover could be performed more easily for cells that satisfy the requested delay and that a handover would be more difficult to perform for cells that do not satisfy the requested delay. For example, if the threshold value is a value where the value indicating wireless quality of the currently connected base station is subtracted from the value indicating wireless quality of surrounding base stations, and if the terminal device transmits a MR) when the threshold value is exceeded, base stations that do not satisfy the requested delay are set to a larger threshold value. This prohibits a handover to a base station that does not satisfy the requested delay as long as the wireless quality of the base station that does not satisfy the requested delay is not exceedingly high compared to the wireless quality of the currently connected base station. For example, by setting the threshold value of the base station that does not satisfy the requested delay to 100 dB, a handover to that base station will most likely not occur. On the other hand, decreasing the threshold value for a base station that satisfies the requested delay makes performing a handover to that base station easier. For example, by setting the threshold value of a base station that satisfies the requested delay to 0 dB, a handover process to the base station that satisfies the requested delay will begin at the point where the wireless quality of that base station exceeds that of the currently connected base station. Increasing the difference between the threshold value of base stations that do not satisfy the requested delay and the threshold value of base stations that do satisfy the requested delay enables a remarkable decrease in the probability of a handover being performed to a base station that does not satisfy the requested delay. Note that the handover controller 304 may prioritize just preventing a handover to base stations that do not satisfy the requested delay by changing the threshold value of only those base stations that do not satisfy the requested delay to prevent a handover and may leave the threshold value of base stations that satisfy the requested delay unchanged from a value where the requested delay is not taken into account. Note that even in this case, the handover controller 304 may change the threshold value of base stations that satisfy the requested delay for an easier handover when the controller determines that a handover is necessary before communication becomes difficult due to a drop in wireless quality. In other words, the handover controller 304 may be set to execute the fundamental operation of control preventing to handover to base stations that do not satisfy the requested delay, and may be set to execute control to facilitate a handover to base stations that do satisfy the requested delay.

Note that when terminal devices acquire information regarding these threshold values, the terminal devices transmit a Measurement Report (MR) to base stations containing cells (base stations) that satisfy the conditions for executing a handover based on measured wireless quality and the threshold value thereof when the conditions are satisfied. In response to receiving this MR, the handover controller 304 executes a process to start a handover to a cell (base station) notified in the MR. For example, the handover controller 304 receives a handover request to a handover destination base station, obtains authorization from the base station, and transmits a message (for example, a RRC message) to a terminal device giving handover instructions. Then, by receiving this message, the terminal device severs the connection between the terminal device and the currently connected base station and executes a connection process with the handover destination base station. Note that as these procedures are the same as conventional handover procedures, the details thereof will not be described. In this manner, terminal devices may be prevented from connecting to base stations that do not satisfy the requested delay by changing the threshold value for handovers.

Note that while base stations notify terminal devices of a list of adjacent cells for the purpose of measuring wireless quality, the handover controller 304 according to the present embodiment may execute a process that excludes cells that do not satisfy the requested delay from this adjacent cell list. In addition, the handover controller 304 may also generate a blacklist of cells that do not satisfy the requested delay not to be measured among the cells that are on the adjacent cell list to terminal devices and notify terminal devices. When terminal devices receive this adjacent cell list, the terminal devices do not conduct a measurement and/or report on the measurement results thereof of cells not included in this list, even if those cells are in an environment such that a signal could be received, preventing the start of any handover processes to these cells.

Figure 4:
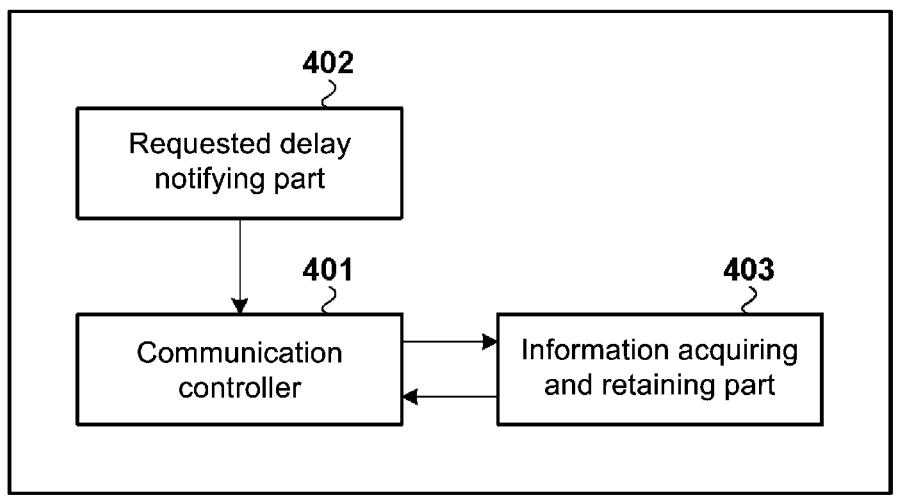
FIG. 4 is a drawing that illustrates an exemplary configuration of functions of a terminal device in accordance with one aspect of the present disclosure.

FIG. 4 illustrates a configuration example of a terminal device according to the present embodiment. A terminal device, for example, includes a communication controller 401, a requested delay notifying part 402, and an information obtaining and retaining part 403. The communication controller 401 establishes a connection with a base station and controls communication. The requested delay notifying part 402 notifies the base station of the allowable value (requested delay) of communication delay requested by the terminal device. This requested delay information may be notified in various forms as described above. The information obtaining and retaining part 403 acquires and retains at least the information related to handover from the base station. For example, when the communication controller 401 reports the measurement results of wireless quality of surrounding base stations that were detected to the currently connected base station, the information obtaining and retaining part 403 acquires and retains threshold value information such as those described above regarding one or more base stations detected but which are not currently connected. In addition, the information obtaining and retaining part 403 may acquire and retain the adjacent cell list (that excludes cells not satisfying requested delay) notified by the base station. The communication controller 401 may execute the processes for handover, such as transmitting an MR, based on information retained by the information obtaining and retaining part 403.

The following are descriptions of several examples of process flows regarding the communication system as described above.

Figure 5:
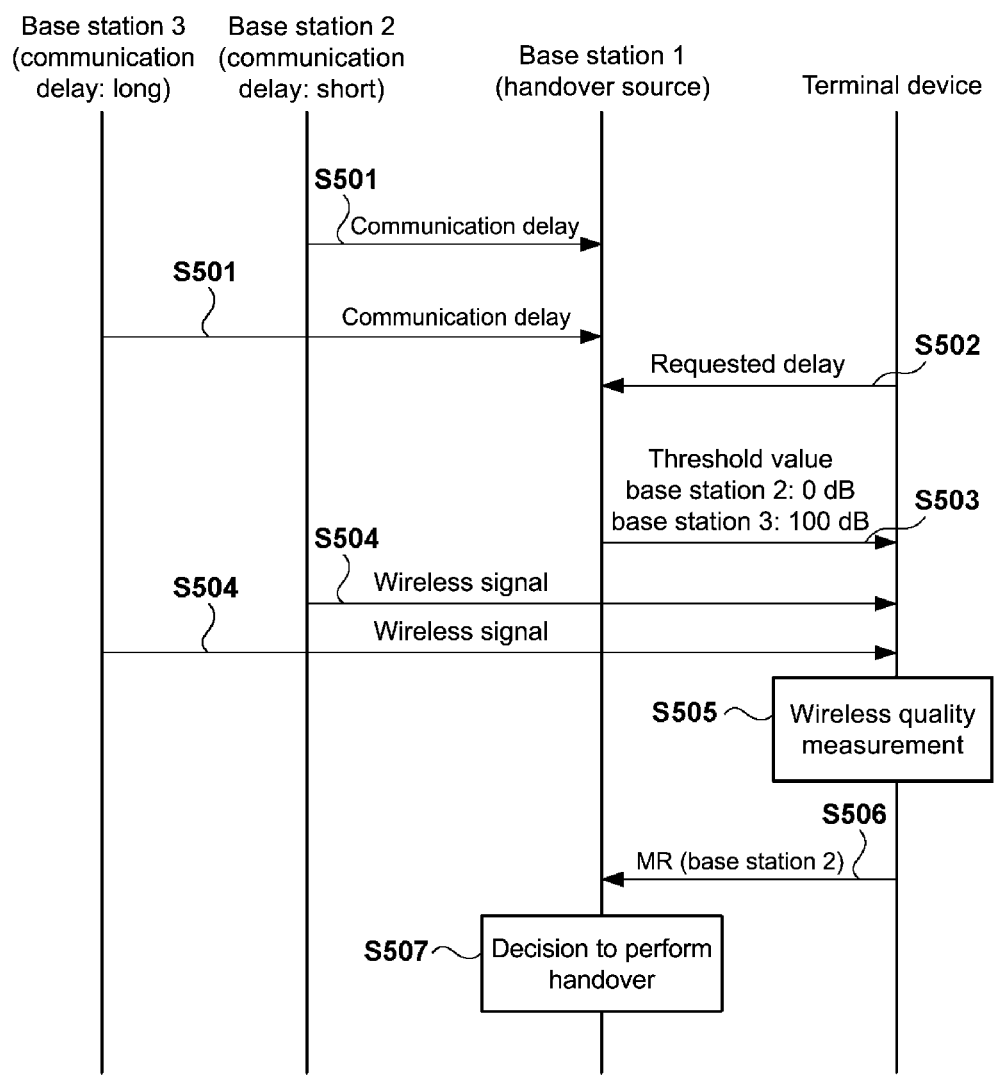
FIG. 5 is a drawing that illustrates an example of a process flow executed by a communication system in accordance with one aspect of the present disclosure.

FIG. 5 illustrates an example of a process flow of a base setting a handover threshold value based on the communication delay of surrounding base stations. In the present example, base station 1 is a base station currently connected with a terminal device (handover source) and base station 2 and base station 3 are base stations forming adjacent cells to the cell formed by base station 1. Base station 2 and base station 3 collect communication delays of past communication through each base station and provide notification of the same to base station 1 (S501). In addition, the terminal device transmits the requested delay to base station 1, for example while in a connected state or during the process of establishing a connection (S502). Here, the communication delay of the base station 2 is small enough to sufficiently satisfy the requested delay of the terminal device and the communication delay of the base station 3 is large to the point of not satisfying the requested delay of the terminal device. Note that while not illustrated, the base station 1 also notifies the communication delay information thereof to base station 2 and base station 3. This communication delay notification is performed, for example, periodically. Note that notifications of requested delay from terminal devices may be performed just one time, for example when connecting or when starting an application, or may be performed on a regular basis.

The base station 1 sets the threshold value for handover based on the communication delay information of other surrounding base stations acquired in S501 and the requested delay information of the terminal device acquired in S502 and notifies the terminal device with the threshold value (S503). Here, the terminal device only transmits an MR if the wireless quality of another base station is at a prescribed level more favorable than the wireless quality of the currently connected base station 1. This prescribed level is given as the threshold value. In other words, lower threshold values lead to handover being executed more readily, and higher threshold values lead to handover being executed less readily. Therefore, the threshold value of the base station 2 is set low as the base station satisfies the requested delay, and the threshold value of the base station 3 is set high as the base station 3 does not satisfy the requested delay. In the example in FIG. 5, the threshold value for the base station 2 is set to 0 dB. If, for example, the wireless quality of the base station 2 becomes higher than the wireless quality of the base station 1, the terminal device transmits an MR that includes information regarding the base station 2 to the base station 1. On the other hand, the threshold value of the base station 3 is set to 100 dB. Unless, for example, the wireless quality of the base station 3 becomes better than the wireless quality of the base station 1 by approximately 100 dB, an MR that includes information regarding the base station 3 will not be transmitted to the base station 1. Therefore, this enables preventing transmission of an MR that includes information regarding the base station 3. Note that these values are just an example and the use of other values is of course expected. For example, for cells that do not satisfy the requested delay, the maximum value that may be used as a threshold value may be set as the threshold value of that cell. In addition, for cells that do satisfy the requested delay, the same value as the value set for other terminal devices that have not requested communication delay may be used as the threshold value. For example, in the example in FIG. 5, if the threshold value of a terminal device for which requested delay is not specified is 70 dB, for terminal devices for which requested delay is specified, the threshold value of cells that satisfy the requested delay are set to 70 dB and the threshold value of cells that do not satisfy requested delay are set to 100 dB. In addition, for example, the threshold value of cells that do satisfy the requested delay may be set to 0 dB and the threshold value of the cells that do not satisfy the requested delay may be set to 70 dB.

The terminal device measures wireless quality according to the wireless signals transmitted by surrounding base stations (S504, S505). Furthermore, if the terminal device determines that the measured wireless quality satisfies the conditions corresponding to the threshold value notified in S503, the terminal device transmits an MR containing information regarding the cell that satisfied these conditions (cell ID or base station ID) to base station 1 (S506). For example, the terminal device transmits an MR containing information regarding base station 2 (or information regarding the cell formed by base station 2) to the base station 1 based on the fact that the value, being the wireless quality of base station 1 subtracted from the wireless quality of base station 2, exceeded the threshold value (0 dB). When base station 1 receives this MR, base station 1 decides to handover the terminal device that transmitted the MR (S507). Afterwards, base station 1 performs prescribed handover processes such as transmitting (not illustrated) a handover request to the handover destination base station 2.

Processes such as those described above enable a decrease in the probability of terminal devices generating an MR transmission event, which is a trigger for a handover, for base stations that do not satisfy the requested to delay in comparison to the probability of terminal devices generating an MR transmission event for base stations that do satisfy the requested delay. As a result, this prevents handovers to base stations that do not satisfy the requested delay, and makes a handover to base stations that do satisfy the requested delay easier. Note that the embodiment as described above describes base stations setting threshold values for handover regarding base stations that do not satisfy the requested delay, however, settings are not limited thereto. For example, a device other than a base station, such as a network node or the like, may perform the processes as described above. In other words, any arbitrary device such as a base station, network, or the like may have controller functions such as setting a handover threshold value the same as the base stations as described above.

Figure 6:
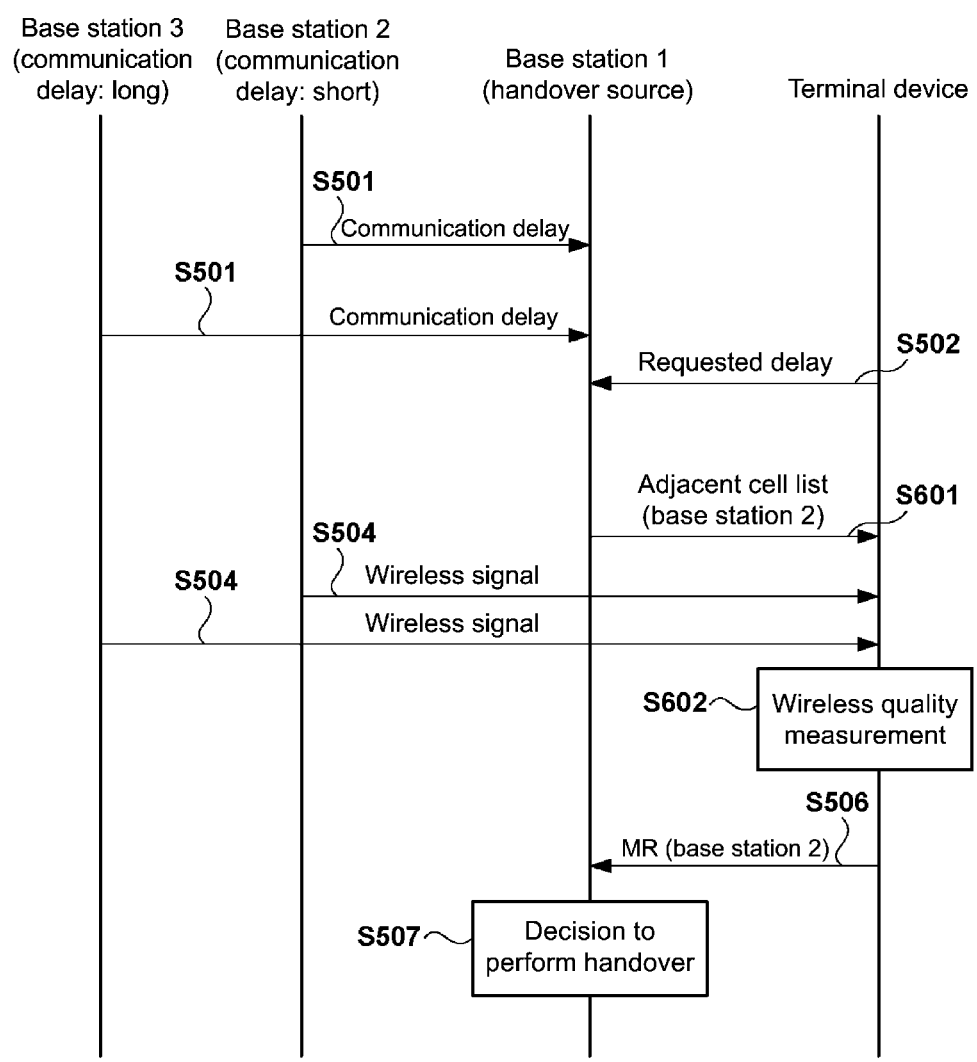
FIG. 6 is a drawing that illustrates an example of a process flow executed by the communication system in accordance with one aspect of the present disclosure.

FIG. 6 illustrates an example of a process flow where a base station removes the information of a cell that does not satisfy the requested delay from the adjacent cell list based on the communication delay of surrounding base stations and the requested delay of the terminal device. Note that steps with the same operation as those in FIG. 5 are given the same reference number. For the process in FIG. 6, base station 1 acquires communication delay information from other base stations (S501) and acquires requested delay information from the terminal device (S502). The base station configures an adjacent cell list based on this information and notifies the terminal device with the list (S601). Here, base station 1 determines that the communication delay of base station 3 exceeds the requested delay and transmits an adjacent cell list to the terminal device that does not include base station 3. Note that base station 1 may also transmit a blacklist containing information regarding base station 3 which excludes base station 3 as applicable for measurement. In this case, the terminal device is able to receive a wireless signal sent by base station 2 and base station 3 (S504), however, based on the acquired adjacent cell list or blacklist, the terminal device performs a wireless quality measurement regarding the wireless signal of base station 2 but does not perform a wireless quality measurement regarding the wireless signal of base station 3 (S602). Therefore, the terminal device does not transmit an MR to base station 3 even if the wireless quality of base station 3 satisfies the conditions for sending an MR (for example, exceeding the threshold value as described above). On the other hand, if the wireless quality of base station 2 satisfies the conditions for sending an MR, the terminal device transmits an MR containing information regarding base station 2 (S506). Base station 1 decides to handover the terminal device to base station 2 based on this MR (S507). Note that the threshold value used to determine whether or not to transmit the MR in S506 may be set to a value that allows a handover to be performed more easily similar to process example 1. For example, control may be performed such that if the communication delay of base station 2 is lower than the communication delay of base station 1, the threshold value of base station 2 is lowered. Control may also be performed such that if the communication delay of base station 2 is longer than the communication delay of base station 1, the threshold value of base station 2 is increased. This allows for an easier connection between a terminal device and the base station with the shortest communication delay.

The process as described above enables the prevention of terminal devices to be handed over to base stations that do not satisfy the requested delay by removing that base station as a target of measurement for wireless quality. As a result, the terminal device may be sequentially handed over between a plurality of base stations that satisfy the requested delay, allowing for a specific service to continue with a sufficiently short delay. Note that in the embodiment as described above, base stations perform control of removing base stations that do not satisfy the requested delay as a target of measurement for wireless quality, however, performing of control is not limited to the same. For example, a device other than a base station, such as a network node or the like, may perform the processes as described above. In other words, any arbitrary device such as a base station, network, or the like may have controller functions such as setting a handover threshold value the same as the base stations as described above.

Note that the present embodiment described the events with the assumption of using measured communication delay information of base stations conforming to cellular communication standards, however, measured communication delay information related to other communication devices such as WLAN access points and the like may be used. In other words, with the assumption that a connection is made with another arbitrary device that may communicate under communication standards supported by the terminal device, the measured communication delay information for at least a part of the communication path to the opposing communication device (operator device) may be used. Furthermore, as needed, the terminal device may be connected to, for example, WLAN access points and the like based on measured communication delay information of WLAN and the like. In this example, the cellular base station cooperates with a WLAN access point to provide a terminal device with communication services under a system such as LWA (LTE WLAN Aggregation) and the like, and under the control of the cellular base station, the terminal device may connect to the WLAN access point which has a shorter measured communication delay.

According to one aspect of the present disclosure, a controller is provided. The controller may include a memory for storing computer readable code and a processor operatively coupled to the memory. The processor may be configured to: acquire communication delay information by communication with a base station, acquire requested delay information regarding allowable delay of a terminal device connected for communication to another base station, and notify a setting to the terminal device regarding cells which the terminal device measures wireless quality, wherein the notified setting is based on the communication delay information with the base station and the requested delay information regarding allowable delay of the terminal device connected for communication to the other base station.

The controller according to the above, wherein the notified setting for which the terminal device measures wireless quality of cells includes base stations with shorter communication delays than the requested delay information and excludes base stations with longer communication delays than the requested delay information.

The controller according to the above, wherein the notified setting includes a list that excludes base stations with a communication delay longer than the requested delay information, wherein the base stations correspond to cells that are not measured for wireless quality by the terminal device.

The controller according to the above, wherein the notified setting includes a blacklist indicating base stations with a longer communication delay than the requested delay information, wherein the base stations within the blacklist correspond to cells that should not be measured for wireless quality by the terminal device.

The controller according to the above, wherein the communication delay information is based on a communication delay from communications that base stations performed in the past.

The controller according to the above, wherein the processor, operatively coupled to the memory, is configured to: handover the terminal device based on the measured wireless quality measured by the terminal device which were defined by the notified settings.

The controller according to the above, wherein the controller is included in the other base station.

The controller according to the above, wherein the communication delay information is estimated by communication with the base station.

The controller according to the above, wherein the communication delay information is a maximum value of past communication delays.

According to another aspect of the present disclosure, a terminal device is provided. The terminal device may include a communication circuit and a memory storing instructions when executed by a processor causes the processor to perform processes. The processes may include providing requested delay information regarding allowable delay to a base station connected for communication through the communication circuit, receiving a setting regarding cells for which the terminal device measures wireless quality, wherein the setting is based on estimated communication delay information and the requested delay information for another base station that the terminal device can connect to for communication, and notifying the wireless quality measured based on the setting to the base station.

The terminal device according to the above, wherein the setting comprises other base stations with a shorter communication delay than the requested delay information as cells to be measured for wireless quality by the terminal device.

The terminal device according to the above, wherein the setting excludes other base stations with longer communication delay than the requested delay as cells to be measured for wireless quality by the terminal device.

The terminal device according to the above, wherein the memory storing instructions when executed by the processor causes the processor to: receive a list of cells that excludes base stations with a longer communication delay than the requested delay information from cells that should be measured for wireless quality by the terminal device.

The terminal device according to the above, wherein notifying the wireless quality measured based on the setting to the base station comprises not reporting the wireless quality of the other base stations that are not included in the list.

The terminal device according to the above, wherein the memory storing instructions when executed by the processor causes the processor to: receive a blacklist that indicates other base stations with a longer communication delay than the requested delay information which are cells that are not measured for wireless quality by the terminal device.

The terminal device according to the above, wherein notifying the wireless quality measured based on the setting to the base station includes not report the wireless quality of the other base stations that are included in the blacklist.

According to yet another aspect of the present disclosure, a computer-implemented handover method from a base station is provided. The method may include acquiring estimated communication delay information regarding communications via base stations, acquiring requested delay information regarding allowable delay of terminal devices connected for communication to another base station, and notifying a terminal device with settings regarding cells that are measured for wireless quality by the terminal device based on the communication delay The computer-implemented handover method from the base station according to the above, the method including receiving a measurement report from the terminal device and performing a handover for the terminal device from the base station to another.

The computer-implemented handover method from the base station according to the above, the method including acquiring a blacklist indicating base stations with a longer communication delay than the requested delay information that are not to be measured for wireless quality by the terminal device.

The computer-implemented handover method from the base station according to the above, wherein the terminal device is within a vehicle.

According to this embodiment, terminal devices acquire settings regarding cells that enable an appropriate handover destination base station to be selected, and performing wireless quality measurement and reporting based on these settings enables a handover to appropriate base stations according to amount of communication delay.

The present disclosure is not limited to the aforementioned embodiments, and various changes and modifications may be made without departing from the spirit and scope of the present disclosure. Therefore, the following claims are attached to publish the scope of the present disclosure.

The invention claimed is:

1. A controller, comprising:
a memory for storing computer readable code; and
a processor operatively coupled to the memory, the processor configured to:
acquire communication delay information by communication with a base station;
acquire requested delay information regarding allowable delay of a terminal device connected for communication to another base station; and
notify a setting to the terminal device regarding cells which the terminal device measures wireless quality, wherein the notified setting is based on the communication delay information with the base station and the requested delay information regarding allowable delay of the terminal device connected for communication to the other base station.

2. The controller according to claim 1, wherein the notified setting for which the terminal device measures wireless quality of cells comprises base stations with shorter communication delays than the requested delay information and excludes base stations with longer communication delays than the requested delay information.

3. The controller according to claim 1, wherein the notified setting comprises a list that excludes base stations with a communication delay longer than the requested delay information, wherein the excluded base stations correspond to cells that are not measured for wireless quality by the terminal device.

4. The controller according to claim 1, wherein the notified setting comprises a blacklist indicating base stations with a longer communication delay than the requested delay information, wherein the base stations within the blacklist correspond to cells that should not be measured for wireless quality by the terminal device.

5. The controller according to claim 1, wherein the communication delay information is based on a communication delay from communications that base stations performed in the past.

6. The controller according to claim 1, wherein the processor, operatively coupled to the memory, is configured to: handover the terminal device based on the measured wireless quality measured by the terminal device which were defined by the notified settings.

7. The controller according to claim 1, wherein the controller is included in the other base station.

8. The controller according to claim 1, wherein the communication delay information is estimated by communication with the base station.

9. The controller according to claim 1, wherein the communication delay information is a maximum value of past communication delays.

10. A terminal device comprising:
a communication circuit;
a memory storing instructions when executed by a processor causes the processor to:
provide requested delay information regarding allowable delay to a base station connected for communication through the communication circuit;
receive a setting regarding cells for which the terminal device measures wireless quality, wherein the setting is based on estimated communication delay information and the requested delay information for another base station that the terminal device can connect to for communication;

notify the wireless quality measured based on the setting to the base station.

11. The terminal device according to claim 10, wherein the setting comprises other base stations with a shorter communication delay than the requested delay information as cells to be measured for wireless quality by the terminal device.

12. The terminal device according to claim 11, wherein the setting excludes other base stations with longer communication delay than the requested delay as cells to be measured for wireless quality by the terminal device.

13. The terminal device according to claim 10, wherein the memory storing instructions when executed by the processor causes the processor to: receive a list of cells that excludes base stations with a longer communication delay than the requested delay information from cells that should be measured for wireless quality by the terminal device.

14. The terminal device according to claim 13, wherein notifying the wireless quality measured based on the setting to the base station comprises not reporting the wireless quality of the other base stations that are not included in the list.

15. The terminal device according to claim 10, wherein the memory storing instructions when executed by the processor causes the processor to: receive a blacklist that indicates other base stations with a longer communication delay than the requested delay information which are cells that are not measured for wireless quality by the terminal device.

16. The terminal device according to claim 15, wherein notifying the wireless quality measured based on the setting to the base station comprises not reporting the wireless quality of the other base stations that are included in the blacklist.

17. A computer-implemented handover method from a base station, the method comprising:

acquiring estimated communication delay information regarding communications via base stations;

acquiring requested delay information regarding allowable delay of terminal devices connected for communication to another base station; and notifying a terminal device with settings regarding cells that are measured for wireless quality by the terminal device based on the communication delay information of the base station and the requested delay information.

18. The computer-implemented handover method from the base station of claim 17, the method comprising:

receiving a measurement report from the terminal device; and performing a handover for the terminal device from the base station to another base station.

19. The computer-implemented handover method from the base station of claim 17, the method comprising: acquiring a blacklist indicating base stations with a longer communication delay than the requested delay information that are not to be measured for wireless quality by the terminal device.

20. The computer-implemented handover method from the base station of claim 17, wherein the terminal device is within a vehicle.

* * * * *